(12) United States Patent
Zhang

(10) Patent No.: US 8,980,974 B2
(45) Date of Patent: Mar. 17, 2015

(54) LOW COPPER-CONTAINING FRICTION MATERIAL COMPOSITION USED AS BRAKE PAD

(75) Inventor: Jim Zewei Zhang, Xiantao (CN)

(73) Assignee: Ruiyang Automotive Materials (Xiantao) Co., Ltd., Xiantao, Hubei (CN)

( * ) Notice: Subject to any disclaimer, the term of this patent is extended or adjusted under 35 U.S.C. 154(b) by 0 days.

(21) Appl. No.: 14/118,873

(22) PCT Filed: Jun. 22, 2011

(86) PCT No.: PCT/CN2011/076089
§ 371 (c)(1),
(2), (4) Date: Feb. 26, 2014

(87) PCT Pub. No.: WO2012/159284
PCT Pub. Date: Nov. 29, 2012

(65) Prior Publication Data
US 2015/0031788 A1    Jan. 29, 2015

(30) Foreign Application Priority Data

May 21, 2011 (CN) .......................... 2011 1 0132150

(51) Int. Cl.
| | |
|---|---|
| *C08J 5/14* | (2006.01) |
| *B22C 1/22* | (2006.01) |
| *A63B 37/00* | (2006.01) |
| *C08K 3/00* | (2006.01) |
| *A01H 5/00* | (2006.01) |
| *C04B 26/06* | (2006.01) |
| *C08K 3/08* | (2006.01) |
| *C04B 28/26* | (2006.01) |
| *F16D 69/02* | (2006.01) |

(52) U.S. Cl.
CPC ....................................... *F16D 69/02* (2013.01)
USPC ........... 523/156; 523/149; 523/150; 523/153; 524/433; 524/424; 524/428; 524/437; 524/540; 524/440; 524/442; 524/404

(58) Field of Classification Search
USPC ......... 524/433, 424, 428, 437, 540, 440, 442, 524/404; 523/149, 150, 153, 156
See application file for complete search history.

(56) References Cited

U.S. PATENT DOCUMENTS

| | | | |
|---|---|---|---|
| 3,959,194 A * | 5/1976 | Adelmann ..................... 523/158 |
| 4,585,691 A * | 4/1986 | Nishimura et al. ........... 442/379 |
| 5,385,989 A * | 1/1995 | Ohya ............................ 525/502 |
| 5,433,774 A * | 7/1995 | Kapl et al. ...................... 106/36 |
| 2003/0167969 A1* | 9/2003 | Huener et al. ................... 106/36 |
| 2005/0004258 A1* | 1/2005 | Yamamoto et al. ........... 523/149 |
| 2010/0196691 A1* | 8/2010 | Unno et al. .................... 428/221 |
| 2010/0233464 A1* | 9/2010 | Unno ............................. 428/323 |

FOREIGN PATENT DOCUMENTS

CN      101555916     * 10/2009 ............. F16D 69/02

OTHER PUBLICATIONS

Derwent Abstract of CN 101555916, pp. 1-2, 2009.*

* cited by examiner

*Primary Examiner* — Alexander Kollias
(74) *Attorney, Agent, or Firm* — Kory D. Christensen; Stoel Rives LLP

(57) ABSTRACT

A low copper-containing friction material composition used for brake pad is provided, which consists of 4-6 parts of aramid fiber, 2-2.5 parts of tire powder, 5-6 parts of magnesia, 5-6 parts of red vermiculite, 8-10 parts of ceramic fiber, 3.5-5 parts of magnetite, 7-8 parts of boron-containing phenolic resin, 15-17 parts of calcium sulfate crystal whisker, 16-18 parts of potassium titanate, 15-17 parts of barite, 5.5-7 parts of flake graphite, 6-8 parts of friction powder of cashew nut oil, 6-8 parts of calcined petroleum coke, 1.5-2 parts of boron nitride, 5-7 parts of flake aluminum powder, 0.4-0.5 parts of pure copper fiber, and 0.4-0.6 parts of black silicon carbide. The friction material composition has low content of heavy metal, wherein the content of copper is lower than 0.5%, has a satisfactory high temperature and thermal decay resistant performance, long service life, good abrasion resistance and stable friction coefficient.

3 Claims, No Drawings

LOW COPPER-CONTAINING FRICTION MATERIAL COMPOSITION USED AS BRAKE PAD

FIELD OF THE INVENTION

The present invention relates to a friction material composition for brake pad of vehicles, particularly to a low copper-containing friction material composition for brake pad.

BACKGROUND OF THE INVENTION

Nowadays, the friction material used in vehicles contains a great of heavy metal comprising copper, chromium, cadmium, lead, and the like. A small amount of heavy metal dust may be released from vehicles during every time of braking, which can be accumulated to be harmful in the environment. For example, the compound of cadmium can be absorbed in vivo through breathing and be accumulated in liver or kidney, hereby do harm to kidney and liver. Copper-containing dusts may become biological toxicants for fishes such as salmons after entering into the environment. It is shown that 30% percent of the copper pollution in the environment is caused by brake pad of vehicles. Therefore, the influence of the brake pad of vehicles on the environment must be focused on. Currently, the whole world is making research in how to prevent such phenomenon proceeding. For example, No. SB6577 Bill was signed by the governor of Washington state of US, Chris Gregoire and was allowed in the 61$^{st}$ legislative session. The Bill intends to gradually forbid the use of copper in brake pad of vehicles, and will severely punish transgressors, which cites: since Jan. 1, 2014, the friction material for flake pad of vehicles sold in or to Washington by manufacturers, retailers and dealers shall contain the following substances without exceeding the limited amount based on the total weight: 1. asbestos fibers, no more than 1%; 2. cadmium and the compounds thereof, no more than 0.01%; 3. chromium salts, no more than 0.1%; 4. lead and the compounds thereof, no more than 0.1%; 5. mercury and the compounds thereof, no more than 0.1%. Since Jan. 1, 2021, the friction material for flake pad of vehicles sold in or to Washington by manufacturers, retailers and dealers shall contain no more than 5% of the total weight of copper. Meanwhile, an advisory committee of experts in industry, safety and environment was established to research and assess the feasibility of limiting the amount of copper within 0.5% in the future.

Coincidentally, also in 2010, Schwarzenegger, the governor of California state signed and allowed No. SB346 Bill to require all the manufacturers of brake pad of vehicles to reduce the amount of copper in the friction material of brake pad sold in California state, to no more than 5% till 2021, and to no more than 0.5% till 2025.

The above two American bills indicate the requirement of human for environment protection more severe and careful. Therefore, the manufacturers of parts for vehicles have to draw attention to this, and under the provision that the characteristic of brake pad is assured, it is necessary to find safer, more effective and environmentally friendly friction material to replace heavy metals such as copper so as to meet with the gradually severe requirement for environment protection.

CONTENT OF THE INVENTION

The present invention provides a friction material composition with low braking noise, effective heat conduction and less copper, to solve the technical problems, such as excessive amount of heavy metals such as copper, high braking noise, severe harm to the environment, and the like.

In order to overcome the above problems, the technical solution adopted in the present invention is as following: a low copper-containing friction material composition used for brake pad, consisting of the following components by weight parts: 4~6 parts of aramid fiber, 2~2.5 parts of tyre powder, 5~6 parts of heavy magnesia, 5~6 parts of red vermiculite, 8~10 parts of ceramic fiber, 3.5~5 parts of magnetite, 7~8 parts of boron-containing phenolic resin, 15~17 parts of calcium sulfate crystal whisker, 16~18 parts of potassium titanate, 15~17 parts of barite, 5.5~7 parts of flake graphite, 6~8 parts of friction powder of cashew nut oil, 6~8 parts of calcined petroleum coke, 1.5~2 parts of boron nitride, 5~7 parts of flake aluminum powder, 0.4~0.5 parts of pure copper fiber, 0.4~0.6 parts of black silicon carbide.

Preferably, the friction material composition consists of the following components by weight parts: 4.5 parts of aramid fiber, 2.5 parts of tyre powder, 6 parts of heavy magnesia, 5.7 parts of red vermiculite, 9.5 parts of ceramic fiber, 5 parts of magnetite, 7.7 parts of boron-containing phenolic resin, 16 parts of calcium sulfate crystal whisker, 16.7 parts of potassium titanate, 16 parts of barite, 6 parts of flake graphite, 7.5 parts of friction powder of cashew nut oil, 7 parts of calcined petroleum coke, 1.5 parts of boron nitride, 5.5 parts of flake aluminum powder, 0.43 parts of pure copper fiber, 0.5 parts of black silicon carbide.

Preferably, the low copper-containing friction material composition consists of the following components by weight parts: 5 parts of aramid fiber, 2.3 parts of tyre powder, 5.7 parts of heavy magnesia, 5.5 parts of red vermiculite, 10 parts of ceramic fiber, 4.7 parts of magnetite, 7.3 parts of boron-containing phenolic resin, 16.3 parts of calcium sulfate crystal whisker, 16.7 parts of potassium titanate, 15.5 parts of barite, 6.2 parts of flake graphite, 6.9 parts of friction powder of cashew nut oil, 7.3 parts of calcined petroleum coke, 1.7 parts of boron nitride, 5 parts of flake aluminum powder, 0.46 parts of pure copper fiber, 0.6 parts of black silicon carbide.

The process of using the friction material composition to produce brake pad is as following:

feeding the following components by weight parts into a high-speed dispersion machine: 4~6 parts of aramid fiber, 2~2.5 parts of tyre powder, 5~6 parts of heavy magnesia, 5~6 parts of red vermiculite, 8~10 parts of ceramic fiber, 3.5~5 parts of magnetite, 7~8 parts of boron-containing phenolic resin, 15~17 parts of calcium sulfate crystal whisker, 16~18 parts of potassium titanate, 15~17 parts of barite, 5.5~7 parts of flake graphite, 6~8 parts of friction powder of cashew nut oil, 6~8 parts of calcined petroleum coke, 1.5~2 parts of boron nitride, 5~7 parts of flake aluminum powder, 0.4~0.5 parts of pure copper fiber, 0.4~0.6 parts of black silicon carbide;

stirring the components into a homogeneously dispersed friction material composition in a form of powder;

taking out the friction material composition and putting it into a shaping mould to be shaped by pressing;

combining the friction material composition with a steel back, and putting the steel back into a plate vulcanizing machine, left for 15 minutes under a high temperature of 270° C., and a pressure of 18 MPa; and taking out the brake pad, and removing burrs to form a final product.

The present invention assures the advantage of every component can be sufficiently developed in the friction material through reasonably combining various components. For example, the combination of several new fiber materials can not only compensate the shortcomings of them, but produce excellent performance due to their synergistic effects. The amount of heavy metals in the present invention is extremely low, wherein the amount of copper is less than 0.5%, thus the friction material composition of the present invention is highly environmental friendly. At the same time, during using, the friction material composition can form excellent friction layer and transform membrane. It is shown in trials that the friction material composition of the present invention has a satisfactory high temperature and thermal decay resistant performance, long service life, good abrasion resistance and stable friction coefficient. With the friction material composition of the present invention used, the brake pad of vehicles is sensitive, stable during braking, free of sharp noise during braking, comfortable and not damageable to the disc.

DETAILED DESCRIPTION OF THE INVENTION

The technical solutions of the present invention will be illustrated in more details through the following examples.

Example 1

The following components were poured into a high-speed dispersion machine by weight parts: 4 parts of aramid fiber, 2.2 parts of tyre powder, 5 parts of heavy magnesia, 5 parts of red vermiculite, 8 parts of ceramic fiber, 3.5 parts of magnetite, 7 parts of boron-containing phenolic resin, 15 parts of calcium sulfate crystal whisker, 17 parts of potassium titanate, 15 parts of barite, 7 parts of flake graphite, 6 parts of friction powder of cashew nut oil, 6.5 parts of calcined petroleum coke, 1.5 parts of boron nitride, 6.5 parts of flake aluminum powder, 0.4 parts of pure copper fiber, 0.6 parts of black silicon carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 2

The following components were poured into a high-speed dispersion machine by weight parts: 4.2 parts of aramid fiber, 2 parts of tyre powder, 5.2 parts of heavy magnesia, 5.5 parts of red vermiculite, 9.2 parts of ceramic fiber, 3.9 parts of magnetite, 7.5 parts of boron-containing phenolic resin, 15.5 parts of calcium sulfate crystal whisker, 16 parts of potassium titanate, 16.5 parts of barite, 5.5 parts of flake graphite, 6.5 parts of friction powder of cashew nut oil, 6 parts of calcined petroleum coke, 2 parts of boron nitride, 6 parts of flake aluminum powder, 0.47 parts of pure copper fiber, 0.4 parts of black silicon carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 3

The following components were poured into a high-speed dispersion machine by weight parts: 4.5 parts of aramid fiber, 2.5 parts of tyre powder, 6 parts of heavy magnesia, 5.7 parts of red vermiculite, 9.5 parts of ceramic fiber, 5 parts of magnetite, 7.7 parts of boron-containing phenolic resin, 16 parts of calcium sulfate crystal whisker, 16.7 parts of potassium titanate, 16 parts of barite, 6 parts of flake graphite, 7.5 parts of friction powder of cashew nut oil, 7 parts of calcined petroleum coke, 1.5 parts of boron nitride, 5.5 parts of flake aluminum powder, 0.43 parts of pure copper fiber, 0.5 parts of black silicon carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 4

The following components were poured into a high-speed dispersion machine by weight parts: 5 parts of aramid fiber, 2.3 parts of tyre powder, 5.7 parts of heavy magnesia, 5.5 parts of red vermiculite, 10 parts of ceramic fiber, 4.7 parts of magnetite, 7.3 parts of boron-containing phenolic resin, 16.3 parts of calcium sulfate crystal whisker, 16.7 parts of potassium titanate, 15.5 parts of barite, 6.2 parts of flake graphite, 6.9 parts of friction powder of cashew nut oil, 7.3 parts of calcined petroleum coke, 1.7 parts of boron nitride, 5 parts of flake aluminum powder, 0.46 parts of pure copper fiber, 0.6 parts of black silicon carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Example 5

The following components were poured into a high-speed dispersion machine by weight parts: 4.4 parts of aramid fiber, 2.5 parts of tyre powder, 5 parts of heavy magnesia, 5 parts of red vermiculite, 8.3 parts of ceramic fiber, 4.1 parts of magnetite, 8 parts of boron-containing phenolic resin, 15 parts of calcium sulfate crystal whisker, 16.5 parts of potassium titanate, 17 parts of barite, 7 parts of flake graphite, 8 parts of friction powder of cashew nut oil, 6.5 parts of calcined petroleum coke, 2 parts of boron nitride, 7 parts of flake aluminum powder, 0.5 parts of pure copper fiber, 0.4 parts of black silicon carbide; and were stirred into a homogeneously dispersed friction material composition in a form of powder. The friction material composition was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

The components employed in the examples are described as following:

The aramid fiber has good properties such as high strength, high modulus, high-temperature resistance, acid and base resistance, light weight, and the like. Particularly, its strength is 5-6 times higher than that of a steel wire, its modulus is 2-3 times higher than that of a steel wire or a glass fiber, its tenacity is 2 times higher than that of a steel wire, its weight is only one fifth of that of a steel wire, and it won't decompose or melt at 560° C. The brake pad prepared from aramid fiber has characteristics such as excellent heat resistance, cutting and bending strength, and good braking effect.

The tyre powder (60-80 meshes) is used as elastic filler in the friction material, and plays a role in enhancing friction and reducing noise. The red vermiculite has properties such as porosity, light weight, and high melting point, is particularly used as adiabatic material at high temperature (less than 1000° C.) and fireproofing and insulating material. It forms grog after being heated at high temperature, which can be added into a friction material as filler (50-100 meshes) to function as intensifier and heat stabilizer.

The ceramic fiber employs facial mineral fiber prepared by short-cutting excellent aluminium silicate fiber, which has advantages such as light weight, environmental friendly, high-temperature resistance, good heat stability, low heat conductance, low specific heat, mechanical vibration resistance, high tearing and bending strength, and the like, and can greatly enhance the stability of the friction material during manufacture and use. The ceramic fiber employed in the examples may adopt the high aluminium typed (alumina≥65%) ceramic fiber.

The magnetite (300~350 meshes) as a friction resistance material may be used in a friction material to increase its friction coefficient.

The boron-containing phenolic resin has much better heat resistance, instantaneous high-temperature resistance, ablation resistance and mechanical property than those of common phenolic resin, and can enhance thermal decay performance, recovery performance, abrasion performance and mechanical performance. There are various methods for synthesizing the boron-containing phenolic resin, the most popular one of which is to carry out esterification between boracic acid and phenol to produce an ester of boracic acid and phenol, which is then reacted with formaldehyde to produce boron-modified phenolic resin.

The calcium sulfate crystal whisker (1-6 μm, with an aspect ratio of ≥30) has incorporated the advantages of reinforced fibers and super-fined inorganic fillers, and has various physical and chemical characteristics, such as high strength, modulus, tenacity and insulation performance, and good abrasion resistance, high-temperature resistance, acid and base resistance, corrosion resistance, and IR reflection performance, easy to surface treatment, easy to composite with polymers, non-toxic. The brake pad prepared from calcium sulfate crystal whisker can reduce the thermal decay phenomena caused by thermal decomposition of organic substances at high temperature, has stable friction coefficient, is comfortable during braking, produces no noise and has low abrasion. The calcium sulfate crystal whisker used in the examples may employ the calcium sulfate crystal whisker provided by Hefei Jiankun Chemical Ltd. (of Anhui Province in China).

Potassium titanate may be used as heat insulating material, and can reduce abrasion to 32% less than that of asbestos.

The barite may employ 500-600 meshes of barite powder.

The flake graphite (60-80 meshes) is used to allow the friction material to reduce thermal decay thereof and to stabilize the friction coefficient. The flake graphite used in the examples may employ the flake graphite with a carbon content of 94-99% provided by Daochuan Graphite Mineral (Neixiang County, Henan Province, China). The flake aluminum powder used in the examples may employ the flake aluminum powder provided by Fengrun Special Fiber Limited Corporation (Changzhou City in Jiangsu Province in China).

Addition of a certain ratio of calcined petroleum coke (20-30 meshes) into a friction material can make the friction material have perfect overall performance, and facilitates to prevent metal adhesion, thus enhancing friction property. Moreover, such a coke has a high porosity, thus may increase the friction coefficient of the friction material, and reduce braking noise and thermal decay of the friction material at high temperature.

Boron nitride of hexagonal phase (250-300 meshes) has characteristics such as good lubricity, low thermal expansion coefficient, high chemical stability, and the like. Particularly, its thermal conductivity is comparative to that of steel.

The flake aluminum powder (40-80 meshes) is soft and light, and function to stabilize the friction coefficient and to reduce abrasion in the friction material. The melting of the aluminum powder during friction absorbs a great of heat, performs a function of thermal dispersion, and can prolong the service life of the brake system without damaging the disc.

The pure copper fiber serves to stabilize the friction material of the friction sheet and to reduce abrasion in the friction material. Silicon carbide is particularly stable at high temperature, and can maintain quite good friction coefficient even at higher temperature. The combination of silicon carbide with a small amount of pure copper fiber can effectively reduce the braking decay of the friction material at high temperature. The silicon carbide used in the examples may employ the black silicon carbide with a purity of 98.5% provided by Jiaxin Refractory Limited Corporation (Anyang City in Henan Province in China).

Comparative Example 1

The following components were poured into a high-speed dispersion machine by weight parts: 2 parts of aramid fiber, 1.8 parts of tyre powder (60-80 meshes), 5 parts of heavy magnesia, 8 parts of pure copper fiber, 5.6 parts of red vermiculite, 8.5 parts of ceramic fiber, 3 parts of magnetite, 7 parts of phenolic resin, 13 parts of calcium sulfate crystal whisker, 16.5 parts of potassium titanate, 11 parts of barite (500-600 meshes), 1.7 parts of graphite, 4 parts of flake graphite, 6.5 parts of friction powder of cashew nut oil, 6 parts of calcined petroleum coke; and were stirred into powder. The powder was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

Comparative Example 2

The following components were poured into a high-speed dispersion machine by weight percents: 5% of nitrile butadiene rubber powder, 2% of tyre powder (60-80 meshes), 5% of flake graphite, 8% of foam iron powder, 12% of phenolic resin, 10% grinded steel fiber, 3.5% of alumina fiber, 9% of pure copper fiber, 5% of friction powder of cashew nut oil, 2% of graphite powder, 2% of calcined petroleum coke, 9.3% of barite (500-600 meshes), 3% of chromite powder (300-350 meshes), 2.5% of magnetite powder, 4% of diatomite (500-600 meshes), 9% of glue-sprayed aluminum silicate fiber, 3.4% of flake aluminum powder, 3% of molybdenum disulfide, 0.4% of zinc stearate, 1% of antimonic sulfide, 0.9% of copper sulfide; and were stirred into powder. The powder was then taken out and put into a shaping mould to be shaped by pressing. The friction material composition was combined with a steel back, and the steel back was put into a plate vulcanizing machine, left for 15 minutes under a high temperature of 270° C., and a pressure of 18 MPa. The brake pad was taken out, and a final product was formed by removing burrs.

In order to confirm the effects of the present invention, the brake pads prepared from examples 1-5 and comparative examples 1-2 are tested respectively according to Chinese National Standard GB5763-1998. The results are summarized as following:

| No. | Test item | | Test temperature | | | | | |
|---|---|---|---|---|---|---|---|---|
| | | | 100 °C. | 150 °C. | 200 °C. | 250 °C. | 300 °C. | 350 °C. |
| Example 1 | Friction coefficient(u) | warming | 0.36 | 0.37 | 0.39 | 0.40 | 0.39 | 0.37 |
| | | cooling | 0.39 | 0.40 | 0.40 | 0.39 | 0.40 | |
| | Abrasion rate (V)$10^{-7}cm^3/N \cdot m$ | | | 0.15 | 0.18 | 0.20 | 0.25 | 0.30 | 0.36 |
| Example 2 | Friction coefficient(u) | warming | 0.38 | 0.39 | 0.39 | 0.40 | 0.40 | 0.38 |
| | | cooling | 0.39 | 0.40 | 0.40 | 0.39 | 0.40 | |
| | Abrasion rate (V)$10^{-7}cm^3/N \cdot m$ | | | 0.15 | 0.20 | 0.25 | 0.30 | 0.35 |
| Example 3 | Friction coefficient(u) | warming | 0.38 | 0.39 | 0.39 | 0.40 | 0.39 | 0.38 |
| | | cooling | 0.39 | 0.40 | 0.40 | 0.39 | 0.40 | |
| | Abrasion rate (V)$10^{-7}cm^3/N \cdot m$ | | | 0.15 | 0.20 | 0.25 | 0.30 | 0.35 |
| Example 4 | Friction coefficient(u) | warming | 0.37 | 0.37 | 0.38 | 0.39 | 0.39 | 0.38 |
| | | cooling | 0.38 | 0.38 | 0.39 | 0.38 | 0.38 | |
| | Abrasion rate (V)$10^{-7}cm^3/N \cdot m$ | | | 0.15 | 0.20 | 0.25 | 0.30 | 0.36 |
| Example 5 | Friction coefficient(u) | warming | 0.37 | 0.36 | 0.35 | 0.34 | 0.34 | 0.33 |
| | | cooling | 0.37 | 0.38 | 0.37 | 0.36 | 0.35 | |
| | Abrasion rate (V)$10^{-7}cm^3/N \cdot m$ | | 0.21 | 0.23 | 0.25 | 0.30 | 0.35 | 0.42 |
| Comparative Example 1 | Friction coefficient(u) | warming | 0.38 | 0.38 | 0.39 | 0.40 | 0.39 | 0.38 |
| | | cooling | 0.39 | 0.40 | 0.40 | 0.39 | 0.40 | |
| | Abrasion rate (V)$10^{-7}cm^3/N \cdot m$ | | 0.15 | 0.20 | 0.25 | 0.30 | 0.36 | 0.40 |
| Comparative Example 2 | Friction coefficient(u) | warming | 0.37 | 0.36 | 0.35 | 0.34 | 0.34 | 0.33 |
| | | cooling | 0.38 | 0.38 | 0.37 | 0.36 | 0.35 | |
| | Abrasion rate (V)$10^{-7}cm^3/N \cdot m$ | | 0.21 | 0.23 | 0.25 | 0.30 | 0.35 | 0.42 |

The results show that: though the present invention does not employ heavy metals such as copper and chromium, or greatly reduces their amounts, the new formulations make the brake pads prepared according to the present invention have comparative abrasion performance and thermal decay resistance at high temperature to those of comparative example 1 or 2, thus possess considerable environmental effects.

In order to further confirm the effects of the present invention, the present inventors installed the brake pads prepared according to the present invention to the Buick car from Shanghai General Motor to perform braking experiments. After three drivers (with more than 15 yeas of driving age) repeatedly braked, they all confirmed the brake pads of the present invention were sensitive, stable during braking, produced no noise, and were comfortable.

What is claimed is:
1. A copper-containing friction material composition for a brake pad, wherein the amount copper is less than 0.5 wt. % based on the total copper-containing friction material composition, the copper-containing friction material composition consisting of:

4-6 parts by weight aramid fiber;
2-2.5 parts by weight tire powder;
5-6 parts by weight of heavy magnesia;
5-6 parts by weight red vermiculite;
8-10 parts by weight ceramic fiber;
3.5-5 parts by weight magnetite;
7-8 parts by weight boron-containing phenolic resin;
15-17 parts by weight calcium sulfate crystal whiskers;
16-18 parts by weight potassium titanate;
15-17 parts by weight barite;
5.5-7 parts by weight graphite flake;
6-8 parts by weight friction powder of cashew nut oil;
6-8 parts by weight calcined petroleum coke;
1.5-2 parts by weight boron nitride;
5-7 parts by weight aluminum powder flake;
0.4-0.5 parts by weight pure copper fiber; and
0.4-0.6 parts by weight black silicon carbide.

2. The copper-containing friction material of claim 1, wherein:
the aramid fiber is 4.5 parts by weight;
the tire powder is 2.5 parts by weight;
the magnesia is 6 parts by weight;
the red vermiculite is 5.7 parts by weight;
the ceramic fiber is 9.5 parts by weight;
the magnetite is 5 parts by weight;
the boron-containing phenolic resin is 7.7 parts by weight;
the calcium sulfate crystal whisker is 16 parts by weight;
the potassium titanate is 16.7 parts by weight;
the barite is 16 parts by weight of barite;
the graphite flake is 6 parts by weight;
the friction powder of cashew nut oil is 7.5 parts by weight;
the calcined petroleum coke is 7 parts by weight;
the boron nitride 1.5 parts by weight;
the aluminum flake powder is 5.5 parts by weight;
the pure copper fiber is 0.43 parts by weight; and
the silicon carbide is 0.5 parts by weight.

3. The copper-containing friction material of claim 1, wherein:
- the aramid fiber is 5 parts by weight;
- the tire powder is 2.3 parts by weight;
- the magnesia is 5.7 parts by weight;
- the red vermiculite is 5.5 parts by weight;
- the ceramic fiber is 10 parts by weight;
- the magnetite is 4.7 parts by weight;
- the boron-containing phenolic resin is 7.3 parts by weight;
- the calcium sulfate crystal whisker is 16.3 parts by weight;
- the potassium titanate is 16.7 parts by weight;
- the barite is 15.5 parts by weight of barite;
- the graphite flake is 6.2 parts by weight;
- the friction powder of cashew nut oil is 6.9 parts by weight;
- the calcined petroleum coke is 7.3 parts by weight;
- the boron nitride 1.7 parts by weight;
- the aluminum flake powder is 5.5 parts by weight;
- the pure copper fiber is 0.46 parts by weight; and
- the silicon carbide is 0.6 parts by weight.

* * * * *